Sept. 29, 1959 W. G. YOUNG 2,906,491
VALVES
Filed July 29, 1955 2 Sheets-Sheet 1

INVENTOR
William G. Young

INVENTOR
William G. Young

United States Patent Office 2,906,491
Patented Sept. 29, 1959

2,906,491

VALVES

William G. Young, Cranberry Township, Butler County, Pa.

Application July 29, 1955, Serial No. 525,253

11 Claims. (Cl. 251—167)

This invention relates to valves and particularly to a novel gate valve. Gate valves have been used for many years. Various types of construction have been proposed by means of which the valve closure member could be raised out from between the opposite sides of the valve to permit flow of fluid therethrough. Difficulty, however, has been experienced in maintaining a seal between the closure member and the inner ports of the valve because of the high rate of wear on the closure member and the valve ports caused by the rubbing action of the closure member on the face of the port. This is particularly true in the case of the downstream port where the pressure of the fluid being retained presses the closure member against the face of the port causing undue wear. As a result of the excessive wear, the gate valves which have been heretofore used have had a relatively short life span in service and have not been entirely satisfactory, particularly where high pressures are involved.

I have invented a valve structure embodied in a gate valve which eliminates all of the difficulties of the valves heretofore proposed. I provide a gate valve comprising a housing, a flow hole extending through the housing, a valve chamber intermediate the ends of the flow hole having opposed inlet and outlet ports, a shaft movable in said valve chamber transverse to the flow hole, wedge means on the shaft movable in the chamber transversely to the flow hole and having oppositely inward beveled surfaces, facing towards the ports, a closure member slidable on each of the beveled faces and having a face engageable with the adjacent port to close it, stop means are provided adjacent each port, engaging the closure member and limiting its movement transverse to the flow hole short of the complete movement of the wedge member into the flow hole whereby the closure members are caused to move in line with the flow hole into the ports. I provide restraining means holding the closure member against movement transverse to the flow line as the wedge member is withdrawn from the flow hole until the closure member has moved out of contact with the ports. Preferably, the ports are axially aligned on opposite sides of the valve chambers and are provided with cooperating guide means engaging ways on the wedge member whereby to space and guide the wedge member between them. Preferably, the closure members are keyed to the beveled faces of the wedge member to move in contact with the beveled face to open and close the ports. The stop means limiting the movement of the closure member is preferably a shoulder adjacent each of the ports cooperating with a lug on the closure member. The restraining means limiting the movement of the closure member as the wedge moves out of the flow hole is preferably a lug adjacent the shoulder on the port cooperatively engaging the lug on the closure member. Resilient means are preferably provided in the wedge members to act on the closure member to hold it in fixed position on the wedge.

Certain features, advantages and objects of my invention will be apparent from the foregoing general description of my invention. Other objects, features and advanages will become apparent from the following description and accompanying drawings in which.

Figure 1:
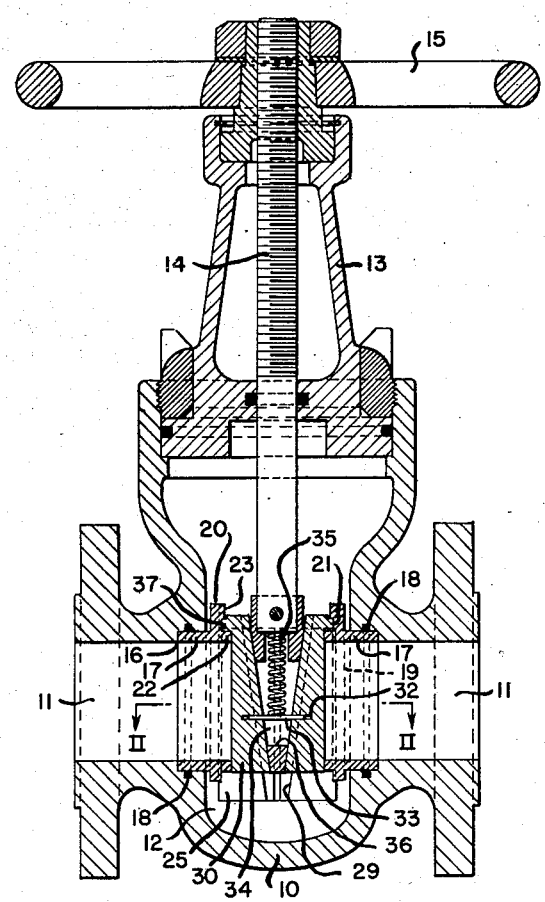
Figure 1 is a transverse section through a valve and stem according to my invention.

Referring to the drawings, I have illustrated a gate valve having a housing 10 with a flow hole 11 therethrough. A valve chamber 12 is provided intermediate the ends of the flow hole 11 internally of the housing. The valve chamber 12 is open at the top to provide access into the interior of the housing and is provided with a closing bonnet 13, carrying a threaded valve stem 14 and an operating handle 15 for actuating the stem 14 which in the illustrated embodiment is vertically movable in the valve chamber 12. The opening of the flow hole 11 into the valve chamber 12 at each side of the valve housing is provided with a recess 16 into which is slidably fitted a port member 17, sealingly engaging the recess 16 with O-rings 18. Each port member 17 is provided with ways 19 on opposite sides thereof and generally parallel to the direction of movement of the shaft 14. Each port member 17 is provided with a radially extending flange 20 having a recess 21 formed by a pair of shoulders 22 and 23, the shoulder 22 being formed by the top of the port member 17 and extending into the valve chamber a greater distance than the shoulder 23.

The stem 14 is provided with a wedge member 24 vertically movable with the stem. Guide members 25 are provided on opposite sides of the wedge member and are held in fixed relation thereto by keys 26 and bolts 27 which pass through the guide members and the wedge member. Each of the guide members 25 has a shoulder portion 28 sliding on the guide ways 19 of the ports 17. Each of the guide members 25 is provided with ways 29 which parallel the beveled faces of the wedge member 24. A closure member 30 having a flat face adapted to abut the openings in the port member 17 and a beveled face slidable on the bevel face of the wedge 24 is fitted in the guide member 25 and is provided with flanges 31 slidable in the ways 29 in the guide members 25. Each of the closure members is provided with a keyway 32 engaged by a key 33 slidable in slot 34 in the wedge member 24. The key 33 is spring loaded by spring 35 which tends to force the closure member downwardly along the beveled face of the wedge member against a stop 36 in the wedge member 24. Each closure member is provided with a lug 37 projecting outwardly from the face thereof in the direction of the flow hole so as to engage the shoulder 22 as the wedge member 24 moves downwardly in the valve chamber to hold the closure member short of the full movement of the wedge member. As the wedge member 24 is moved downwardly (viewing Figure 1) the closure member 30 moves horizontally into engagement with the face of the port member 17, causing the lug 37 to move along the shoulder 22 into the recess 21 and beneath the shoulder 23.

When the valve handle 15 is rotated to raise the stem 14, the wedge member 24 rises vertically, viewing Figure 1. At the same time, the shoulder 23 cooperates with the lug 37 to hold the closure member 30 against vertical movement until the wedge member has traveled vertically sufficient distance to move the closure member 30 away from the face of the port member 17 and clear the lug 37 from the shoulder 23. When the closure member has cleared the shoulder 23, the key 33 and spring 35 will continue to exert pressure until the closure 30 reaches the stop 36 on the wedge member 24 after which the closure member and the wedge member will rise with the valve stem as a single unit without contacting the face of the ports. A lug 30a is formed on the closure member 30 and strikes the base of the bonnet 13 to force the closure member downwardly in the event that it hangs or is otherwise held above the stop 36 by dirt, heavy grease or sticky materials. This method of operation prevents any sliding contact between the closure member and the face of the port and prevents wear on either the closure member or the port.

Figure 2:
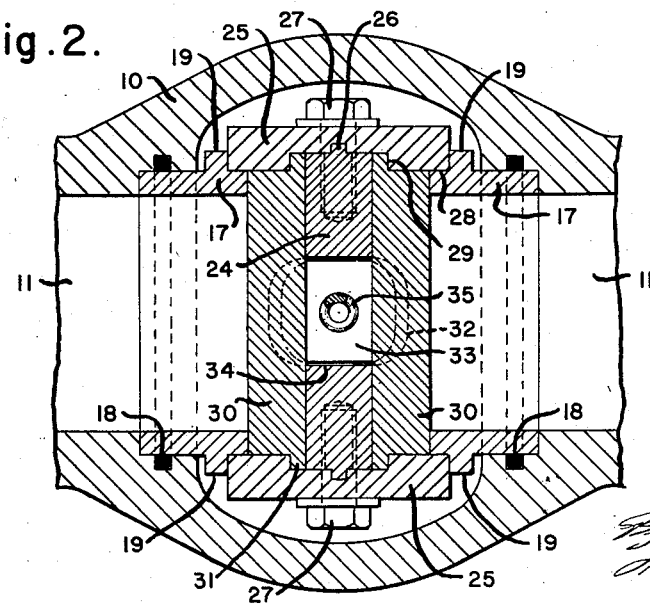
Figure 2 is a section on the line II—II of Figure 1.
Figure 4:
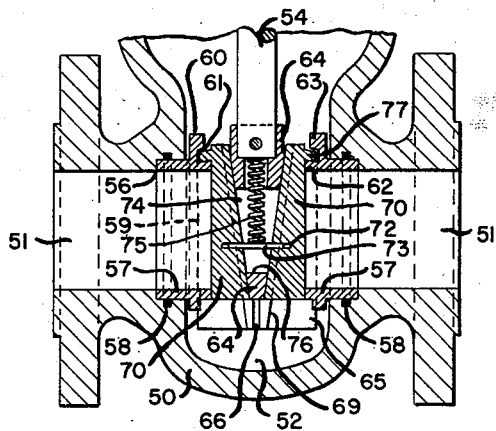
Figure 4 is a transverse section similar to that of Figure 1 of a second embodiment of my invention.
Figure 3:
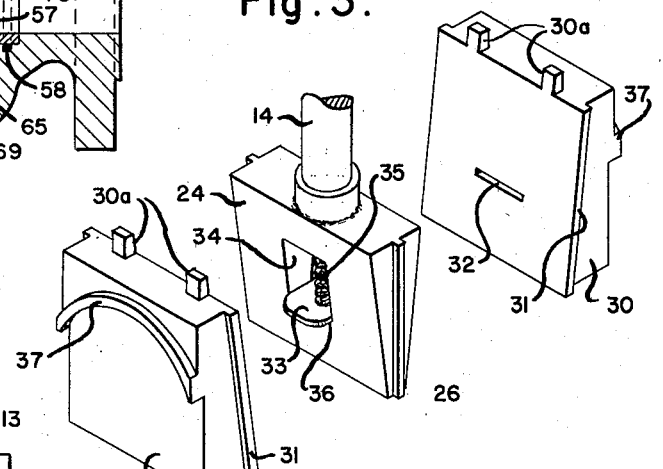
Figure 3 is an exploded isometric view of the wedge and enclosure members used in the embodiment of Figure 1.

The embodiment illustrated in Figure 4 is essentially the same as that of Figures 1 through 3. In Figure 4 I have illustrated a gate valve having a housing 50 with a flow hole 51 therethrough. A valve chamber 52 is provided intermediate the ends of the flow hole 51 internally of the housing. The valve chamber 52 is open at the top to provide access into the interior of the housing and is provided with a closing bonnet identical with bonnet 13, carrying a threaded valve stem 54 and an operating handle identical with handle 15 for actuating the stem 54 which in the illustrated embodiment is vertically movable in the valve chamber 52. The opening of the flow hole 51 into the valve chamber 52 at each side of the valve housing is provided with a recess 56 into which is slidably fitted a port member 57, sealingly engaging the recess 56 with O-rings 58. Each port member 57 is provided with ways 59 on opposite sides generally parallel to the direction of movement of the shaft 54. Up to this point the valve structure of Figure 4 is identical with that of Figures 1 to 3. Each port member 57 is provided with a radially extending flange 60 having a recess 61 sloping downwardly and away from the valve chamber and formed by a pair of spaced beveled shoulders 62 and 63, the shoulder 62 being formed by the top of the port member 57 and extending into the valve chamber a greater distance than the shoulder 63.

The stem 54 is provided with a wedge member 64 vertically movable with the stem, guide members 65 are provided on opposite sides of the wedge member and are held in fixed relation thereto by keys and bolts which pass through the guide members and the wedge member in the manner of Figures 1 through 3. Each of the guide members 65 has a shoulder portion sliding on the guide ways 59 of the ports 57.

Each of the guide members 65 is provided with ways 69 which parallel the beveled faces of the wedge member 64. A closure member 70 having a flat face adapted to abut the openings in the port member 57 and a beveled face slidable on the bevel face of the wedge 64 is fitted in the guide member 65 and is provided with flanges slidable in the ways 69 in the guide members 65. Each of the closure members is provided with a keyway 72 engaged by a key 73 slidable in a slot 74 in the wedge member 64. The key 73 is spring loaded by spring 75 which tends to force the closure member downwardly along the beveled face of the wedge member against a stop 76 on the wedge members 64. Each closure member is provided with a beveled lug 77 projecting outwardly from the face thereof in the direction of the flow hole so as to engage the shoulder 62 as the wedge member 64 moves downwardly in the valve chamber so as to hold the closure member short of the full movement of the wedge member. As the wedge member 64 is moved downwardly the closure member 70 moves horizontally, viewing Figure 4 into engaging with the face of the port member 57, causing the lug 77 to move along the shoulder 62 into the recess 61 beneath the shoulder 63. Simultaneously with the horizontal movement of the closure member 70 into engagement with the face of the port member, there is a slight vertical movement of the closure member with respect to the face of the port member 57 caused by the slope of the shoulder 62 and the bevel of the lug 77. This slight vertical movement of the closure member 70 produces a "wiping action" between it and the port member 57, thereby producing a better seal. This wiping action is particularly useful in those instances where the closure member is provided with a sealing gasket of nonresilient or only slightly resilient corrosion resisting plastic or the like materials (not shown).

When the valve handle is rotated to raise the stem 54, the wedge member 64 rises vertically, viewing Figure 4. The shoulder 63 cooperates with the key 73 and spring 75 to hold the closure member 70 against vertical movement (except the small amount caused by the bevel lug 77 and shoulder 63) until the wedge member has traveled vertically sufficient distance to move the closure member 70 away from the ways of the port member 57. When the closure member has cleared the shoulder 63, the key 73 and spring 75 will continue to exert pressure until the closure 70 reaches the stop 76 on the wedge member 64 after which the closure member and the wedge member will rise with the valve stem as a single unit without contacting the face of the ports. This method of operation prevents any sliding contact between the closure member and the face of the port, other than the wiping action mentioned above, and prevents wear on either the closure member or the port.

Figure 5:
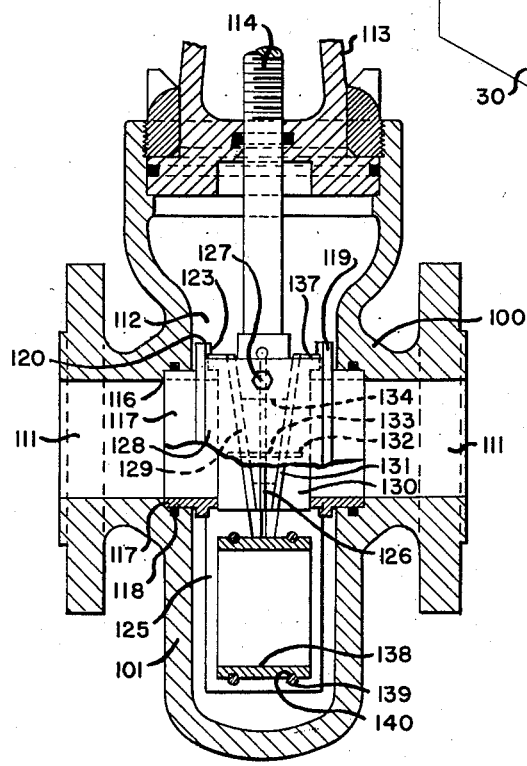
Figure 5 is a transverse section showing a third embodiment of my invention in the form of a thru-conduit valve.

In Figure 5 I have illustrated a thru conduit valve according to my invention. In the embodiment of Figure 5 I have shown a housing 100 generally similar to the housing of Figure 1 but provided with a well 101 below a flow hole 111 and a valve chamber 112. The valve chamber 112 is open at the top to provide access into the interior of the housing and is provided with a closing bonnet 113, carrying a threaded valve stem 114 and an operating handle identical with handle 15, for actuating the stem 114 which in the illustrated embodiment is vertically movable in the valve chamber 112. The opening of the flow hole 111 into the valve chamber 112 at each side of the valve housing is provided with a recess 116 into which is slidably fitted a port member 117, sealingly engaging the recess 116 with O-rings 118. Each port member 117 is provided with ways 119 on opposite sides thereof and generally parallel to the direction of movement of the shaft 114. Each port member 117 is provided with a radially extending flange 120 having a recess 121 formed by a pair of shoulders 122 and 123, the shoulder 122 being formed by the top of the port member 117 and extending into the valve chamber a greater distance than the shoulder 123.

The stem 114 is provided with a wedge member 124 vertically movable with the stem. Guide members 125 are provided on opposite sides of the wedge member and are held in fixed relation thereto by keys 126 and bolts 127 which pass through the guide members and the wedge member. Each of the guide members 125 has a shoulder portion 128 sliding on the guide ways 119 of the ports 117.

Each of the guide members 125 is provided with ways 129 which parallel the beveled faces of the wedge member 124. A closure member 130 having a flat face adapted to abut the openings in the port member 117 and a beveled face slidable on the bevel face of the wedge 124 is fitted in the guide member 125 and is provided with flanges slidable in the ways 129 in the guide members 125. Each of the closure members is provided with a keyway 132 engaged by a key 133 slidable in a slot 134 in the wedge member 124. The key 133 is spring loaded by a spring (not shown) which tends to force the closure member downwardly along the beveled face of the wedge member against a stop 136 in the wedge member 124. Each closure member is provided with a lug 137 projecting outwardly from the face thereof in the direction of the flow hole so as to engage the shoulder 122 as the wedge member 124 moves downwardly in the valve chamber to hold the closure member short of the full movement of the wedge member. As the wedge member 124 is moved downwardly (viewing Fig. 5) the closure member 130 moves horizontally into engagement with the face of the port member 117, causing the lug 137 to move along the shoulder 122 into the recess 121 and beneath the shoulder 123.

When the valve handle is rotated to raise the stem 114, the wedge member 124 rises vertically, viewing Figure 5. At the same time the shoulder 123 cooperates with the lug 137 to hold the closure member 130 against vertical movement until the wedge member has traveled vertically sufficient distance to move the closure member 130 away from the face of the port member 117 and clear the lug 137 from the shoulder 123. When the closure member has cleared the shoulder 123, the key 133 and spring will continue to exert pressure until the closure 130 reaches the stop 136 on the wedge member 124 after which the closure member and the wedge member will rise with the valve stem as a single unit without contacting the face of the ports.

All of the foregoing structure is identical with that of the embodiment of Figures 1 through 3 except that the guide members 125 are elongated and extend into the well 101. A hollow cylindrical member 138 is fixed between the guide members 125 beneath the wedge member 124. The cylindrical member 138 is held in place by bolts 139 passing through the guide members 125 in slots 140 in opposite sides of the cylindrical member 138. When the wedge member 124 is raised against the base of the bonnet 113 which acts as a stop the cylindrical member 138 is carried by the guide member 125 into position between the ports 117 to form a continuous passage through the valve chamber. This prevents or retards erosion of the edges of the ports 117 by the liquid flowing through the valve, permitting better seals and giving the valve a longer useful life.

It is apparent from the foregoing description and the accompanying drawings that the structure of my novel gate valve completely eliminates the dragging of the closure members across the face of the ports and thereby eliminates the excessive wear that has heretofore been characteristic of most gate valves.

While I have illustrated and described certain preferred embodiments of my invention, it will be understood that it may be otherwise embodied within the scope of the following claims.

I claim:

1. A gate valve comprising a housing, a flow hole extending through said housing, a valve chamber in the housing intermediate the ends of the flow hole, opposed inlet and outlet ports in the flow hole communicating with the valve chamber, a shaft movable in said chamber transverse to the flow hole, wedge means on said shaft movable in said chamber transversely to the flow hole, said wedge means having oppositely inwardly beveled surfaces facing toward the ports, a closure member slidable on each of said bevel surfaces and having a face engageable with the ports to close them, stop means in the valve chamber adjacent each port limiting the movement of the closure members transverse to the flow hole short of the complete movement of the wedge member into the valve chamber whereby the closure members are held against further transverse motion and are caused to move axially of the flow hole into sealing contact with the ports all the while in contact with the stop member, and restraining means in the valve chamber holding the closure members against movement transverse of the flow hole and resilient means in the wedge acting on the two closure members urging them in the direction opposite to the movement of the wedge as the wedge member is withdrawn from the valve chamber until the closure member has moved axially of the flow hole out of contact with the ports and the closure member is free of the said restraining means.

2. A gate valve comprising a housing, a flow hole extending through said housing, a valve chamber in the housing intermediate the ends of the flow hole, opposed inlet and outlet ports in the flow hole communicating with the valve chamber, a shaft movable in said chamber transverse to the flow hole, wedge means on said shaft movable in said chamber transversely to the flow hole, said wedge means having oppositely inwardly beveled surfaces facing toward the ports, a closure member slidably keyed on each of said bevel surfaces and having a face engageable with the ports to close them, stop means in the valve chamber adjacent each port limiting the movement of the closure members transverse to the flow hole short of the complete movement of the wedge member into the valve chamber whereby the closure members are held against further transverse motion and are caused to move axially of the flow hole into sealing contact with the ports all the while in contact with the stop member and restraining means including stop means in the valve chamber and resilient means on the wedge acting on the closure members holding the closure members against movement transverse of the flow hole said resilient means in the wedge acting on the two closure members urging them in the direction opposite to the movement of the wedge as the wedge member is withdrawn from the valve chamber until the closure member has moved axially of the flow hole out of contact with the ports and the closure member is free of said restraining means.

3. A gate valve comprising a housing, a flow hole extending through said housing, a valve chamber in the housing intermediate the ends of the flow hole, opposed inlet and outlet ports in the flow hole communicating with the valve chamber, a shaft movable in said chamber transverse to the flow hole, wedge means on said shaft movable in said chamber transversely to the flow hole, said wedge means having oppositely inwardly beveled surfaces facing toward the ports, a closure member slidable on each of said bevel surfaces and having a face engageable with the ports to close them a shoulder adjacent the edge of each port engaging the closure members and limiting the movement of the closure members transverse to the flow hole short of the complete movement of the wedge member into the valve chamber whereby the closure members are held against further transverse motion and are caused to move axially of the flow hole into sealing contact with the ports in the direction of the flow hole all the while in contact with the shoulder and restraining means in the valve chamber holding the closure members against movement transverse of the flow hole and resilient means in the wedge acting on the two closure members urging them in the direction opposite to the movement of the wedge as the wedge member is withdrawn from the valve chamber until the closure member has moved axially of the flow hole out of contact with the ports and the closure members are free of the said restraining means.

4. A gate valve comprising a housing, a flow hole extending through said housing, a valve chamber in the housing intermediate the ends of the flow hole, opposed inlet and outlet ports in the flow hole communicating with the valve chamber, a shaft movable in said chamber transverse to the flow hole, wedge means on said shaft movable in said chamber transversely to the flow hole, said wedge means having oppositely inwardly beveled surfaces facing toward the ports, a closure member slidable on each of said bevel surfaces and having a face engageable with the ports to close them, a lug on each closure member extending parallel to the direction of the flow hole and projecting from the face, a shoulder in the valve chamber adjacent the edge of each port engaging the closure member lugs and limiting the movement of the closure members transverse to the flow hole short of the complete movement of the wedge member into the valve chamber whereby the lugs on the closure members are caused to move axially of the flow hole and the closure members move into contact with the ports, said lugs being all the while in contact with the shoulder a second shoulder in the valve chamber adjacent each port spaced from the first shoulder a distance sufficient to receive the lug on the closure member, said second shoulder being arranged to permit passage of the closure member into contact with the ports and to restrain the closure member against movement transverse of the flow hole and resilient means in the wedge acting on the two closure members urging them in the direction opposite to the movement of the wedge as the wedge member is withdrawn from the valve chamber until the closure member has moved axially of the flow hole out of contact with the ports and the closure members are free of the said restraining means.

5. A gate valve comprising a housing, a flow hole extending through said housing, a valve chamber in the housing intermediate the ends of the flow hole, opposed inlet and outlet ports in the flow hole communicating with the valve chamber, a shaft movable in said chamber transverse to the flow hole, wedge means on said shaft movable in said chamber transversely to the flow hole, cooperating guideways on the wedge and in the valve chamber maintaining the wedge spaced from said ports, oppositely inwardly beveled surfaces on said wedge member facing towards the ports, a closure member slidably keyed on each beveled surface and having a face engageable with the ports to close them, a shoulder adjacent the edge of each port engaging the closure member and limiting the movement of the closure members transverse to the flow hole short of the complete movement of the wedge member into the valve chamber whereby the closure members are caused to move axially of the flow hole into the ports all the while in contact with the shoulder and restraining means in the valve chamber holding the closure members against movement transverse of the flow hole and resilient means in the wedge acting on the two closure members urging them in the direction opposite to the movement of the wedge as the wedge member is withdrawn from the valve chamber until the closure member has moved axially of the flow hole out of contact with the ports and the closure members are free of the said restraining means.

6. A gate valve comprising a housing, a flow hole extending through said housing, a valve chamber in the housing intermediate the ends of the flow hole, opposed inlet and outlet ports in the flow hole communicating with the valve chamber, a shaft movable in said chamber transverse to the flow hole, wedge means on said shaft movable in said chamber transversely to the flow hole, cooperating guideways on the wedge and in the valve chamber maintaining the wedge spaced from said ports, oppositely inwardly beveled surfaces on said wedge member facing towards the ports, a closure member slidably keyed on each beveled surface and having a face engageable with the ports to close them, a lug on the closure member in a plane parallel to the axis of the flow hole a shoulder adjacent the edge of each port engaging the closure member lugs and limiting the movement of the closure members transverse to the flow hole short of the complete movement of the wedge member into the valve chamber whereby the lugs on the closure members are caused to move axially of the flow hole and the closure members move into the ports all the while in contact with the shoulder, a second shoulder in the valve chamber adjacent each port spaced from the first shoulder a distance sufficient to receive the lug on the closure member, said second shoulder being arranged to permit passage of the closure member into the flow hole and resilient means in the wedge acting on the two closure members urging them in the direction opposite to the movement of the wedge and to restrain the closure member against movement transverse of the flow hole as the wedge member is withdrawn from the valve chamber until the closure member has moved axially of the flow hole out of contact with the ports and the closure member is free of the said restraining means.

7. A gate valve comprising a housing, a flow hole extending through said housing, a valve chamber in the housing intermediate the ends of the flow hole, an enlarged annular recess in the flow hole communicating with the valve chamber on opposite sides of said chamber, removable port members slidable in said annular recesses and having annular ports in line with the flow hole, resilient O-rings cooperating with the port members and the annular recesses to seal and release the port members in the recesses, a shaft movable in said chamber transverse to the flow hole, wedge means on said shaft movable in said chamber transversely to the flow hole, said wedge means having oppositely inwardly beveled surfaces facing toward the ports, a closure member slidable on each of said bevel surfaces and having a face engageable with the ports to close them, a lug on each closure member extending parallel to the direction of the flow hole and projecting from the face, a shoulder in the valve chamber adjacent the edge of each port engaging the closure member lugs and limiting the movement of the closure members transverse to the flow hole short of the complete movement of the wedge member into the valve chamber whereby the lugs on the closure members are caused to move axially of the flow hole and the closure members move into the ports all the while in contact with the shoulder, a second shoulder in the valve chamber adjacent each port spaced from the first shoulder a distance sufficient to receive the lug on the closure member, said second shoulder being arranged to permit passage of the closure member into the flow hole and to restrain the closure member against movement transverse of the flow hole and resilient means in the wedge acting on the two closure members urging them in the direction opposite to the movement of the wedge as the wedge member is withdrawn from the valve chamber until the closure member has moved axially of the flow hole out of contact with the ports and the closure member is free of the said restraining means.

8. A gate valve comprising a housing, a flow hole extending through said housing, a valve chamber in the housing intermediate the ends of the flow hole, opposed inlet and outlet ports in the flow hole communicating with the valve chamber, a shaft movable in said chamber transverse to the flow hole, wedge means on said shaft movable in said chamber transversely to the flow hole, cooperating guideways on the wedge and in the valve chamber maintaining the wedge spaced from said ports, oppositely inwardly beveled surfaces on said wedge member facing towards the ports, a closure member slidable on each of said bevel surfaces and having a face engageable with the ports to close them, a sloping shoulder adjacent the edge of each port engaging the closure members and limiting the movement of the closure member transverse to the flow hole short of the complete movement of the wedge member into the valve chamber and cooperating with the wedge to move the closure member axially of the flow hole into contact with the ports and simultaneously to cause a slight movement of the closure member transverse to the flow hole at the instant of contact of the closure member and corresponding port, and restraining means holding the closure members against movement transverse of the flow hole and resilient means in the wedge acting on the two closure members urging them in the direction opposite to the movement of the wedge as the wedge member is withdrawn from the valve chamber until the closure member has moved out of contact with the ports and the closure member is free of the said restraining means.

9. A gate valve comprising a housing, a flow hole extending through said housing, a valve chamber in the housing intermediate the ends of the flow hole, opposed inlet and outlet ports in the flow hole communicating with the valve chamber, a shaft movable in said chamber transverse to the flow hole, wedge means on said shaft movable in said chamber transversely to the flow hole, cooperating guideways on the wedge and in the valve chamber maintaining the wedge spaced from said ports, oppositely inwardly beveled surfaces on said wedge member facing towards the ports, a closure member slidably keyed on each beveled surface and having a face engageable with the ports to close them, a sloping shoulder adjacent the edge of each port engaging the closure members and limiting the movement of the closure member transverse to the flow hole short of the complete movement of the wedge member into the valve chamber and cooperating with the wedge to move the closure member axially of the flow hole into contact with the ports and simultaneously to cause a slight movement of the closure member transverse to the flow hole at the instant of contact of the closure member and corresponding port, and restraining means holding the closure members against movement transverse of the flow hole and resilient means in the wedge acting on the two closure members urging them in the direction opposite to the movement of the wedge as the wedge member is withdrawn from the valve chamber until the closure member has moved out of contact with the ports and the closure member is free of the said restraining means.

10. A gate valve comprising a housing, a flow hole extending through said housing, a valve chamber in the housing intermediate the ends of the flow hole, opposed inlet and outlet ports in the flow hole communicating with the valve chamber, a shaft movable in said chamber transverse to the flow hole, wedge means on said shaft movable in said chamber transversely to the flow hole, said wedge means having oppositely inwardly beveled surfaces facing toward the ports, a closure member slidable on each of said bevel surfaces and having a face engageable with the ports to close them, stop means adjacent each port limiting the movement of the closure members transverse to the flow hole short of the complete movement of the wedge member into the valve chamber whereby the closure members are caused to move in contact with the stop member into the ports in the direction of the flow hole, and restraining means holding the closure members against movement transverse of the flow hole and resilient means in the wedge acting on the two closure members urging them in the direction opposite to the movement of the wedge as the wedge member is withdrawn from the valve chamber until the closure member has moved axially out of contact with the ports and the closure member is free of the said restraining means and conduit means fixed to said wedge means and movable therewith entering into the flow line between the ports when the wedge is withdrawn from the flow line whereby to form a substantially continuous passageway with the inlet and outlet ports through the valve housing.

11. A gate valve comprising a housing, a flow hole extending through said housing, a valve chamber in the housing intermediate the ends of the flow hole, an enlarged annular recess in the flow hole communicating with the valve chamber on opposite sides of said chamber, removable port members slidable in said annular recesses having annular ports in line with the flow hole, resilient O-rings between the port members and the annular recesses to seal and release the port members in the recesses and to permit relative movement therebetween, a shaft movable in said chamber transverse to the flow hole, wedge means on said shaft movable in said chamber transversely to the flow hole, said wedge means having oppositely inwardly beveled surfaces facing toward the ports, a closure member slidable on each of said bevel surfaces and having a face engageable with the ports to close them, guideways on opposite sides of each of the port members extending parallel to the direction of movement of the shaft, cooperating guide members on opposite sides of the wedge engageable in said guideways whereby the wedge and port members are maintained in spaced relation, stop means in the valve chamber adjacent each port limiting the movement of the closure members transverse to the flow hole short of the complete movement of the wedge member into the valve chamber whereby the closure members are held against further transverse motion and are caused to move axially of the flow hole into sealing contact with the ports, all the while in contact with the stop member, and restraining means in the valve chamber holding the closure members against movement transverse of the flow hole as the wedge member is withdrawn from the valve chamber until the closure member has moved axially of the flow hole out of contact with the ports, and the closure member is free of the said restraining means.

References Cited in the file of this patent

UNITED STATES PATENTS

| | | |
|---|---|---|
| 301,367 | Hoag | July 1, 1884 |
| 936,454 | Jefferson | Oct. 12, 1909 |
| 1,057,308 | Watson | Mar. 25, 1913 |
| 1,136,841 | Shaw | Apr. 20, 1915 |
| 1,686,057 | Williston | Oct. 2, 1928 |
| 2,600,115 | Kliewer | June 10, 1952 |

UNITED STATES PATENT OFFICE
CERTIFICATE OF CORRECTION

Patent No. 2,906,491                                                                    September 29, 1959

William G. Young

It is hereby certified that error appears in the printed specification of the above numbered patent requiring correction and that the said Letters Patent should read as corrected below.

Column 2, line 52, for "in slot" read -- in a slot --; column 6, line 42, after "them" insert a comma; column 8, line 12, strike out "and"; column 10, list of references cited, after line 52, add the following:

FOREIGN PATENTS

| | | |
|---|---|---|
| 19,005 | Great Britain | Dec. 19, 1892 |
| 1,038,631 | France | May 13, 1953 |
| 1,095,876 | France | Dec. 29, 1954 |

Signed and sealed this 5th day of April 1960.

(SEAL)
Attest:

KARL H. AXLINE
Attesting Officer

ROBERT C. WATSON
Commissioner of Patents